March 31, 1942.  P. MAGRINI  2,278,328
MANUFACTURE OF DRAWN GLASS
Filed April 29, 1938  2 Sheets-Sheet 1

INVENTOR
Pete Magrini

INVENTOR
Pete Magrini

Patented Mar. 31, 1942

2,278,328

UNITED STATES PATENT OFFICE 2,278,328

MANUFACTURE OF DRAWN GLASS

Pete Magrini, Belle Vernon, Pa., assignor to American Window Glass Company, Pittsburgh, Pa., a corporation of Pennsylvania Application April 29, 1938, Serial No. 205,022

4 Claims. (Cl. 49—83.1)

The present invention relates broadly to the manufacture of drawn glass by the continuous drawing thereof from a bath of molten glass. More particularly it relates to a method whereby bowing or warpage of the glass sheet during the manufacture thereof may be substantially prevented or eliminated and whereby such glass may be drawn without the presence therein of any appreciable amount of the characteristic wave of drawn glass or any appreciable amount of batter. It is particularly applicable to and constitutes an improvement upon the inventions claimed in my copending application filed May 4, 1938, Serial No. 205,959, now Patent No. 2,246,053, dated June 17, 1941.

In the present commercial processes of manufacturing sheet glass a bath of molten glass is provided in a drawing pit and a continuous sheet drawn therefrom by means of appropriate drawing and setting apparatus. In all of such processes the glass sheet is drawn vertically from the bath and travels vertically through the drawing pit for at least a short distance during which time the glass sheet becomes at least partially set. In the Fourcault process the glass sheet is drawn from the molten bath through a longitudinally extending slot in a floater or debiteuse which is held partially submerged in the glass bath, the glass welling upwardly through the slot and being initially started vertically by a suitable bait. The glass sheet is set by means of coolers positioned within the drawing pit upon opposite sides of the slot and the glass passes between these coolers and continues vertically throughout the drawing pit. The rising glass sheet then continues vertically through a long lehr positioned above the pit. This lehr is provided with a plurality of pairs of rolls for carrying the sheet. Adjacent the top of the lehr the sheet is cut to length. In one of the well known modifications of the Fourcault process the floater or debiteuse is not utilized, the sheet being drawn from the surface of the glass bath vertically through the drawing chamber and through a lehr. In the Colburn process and in the various modifications thereof the glass sheet is drawn from the surface of the bath and passes vertically through a part of the drawing pit and is then turned horizontally over a suitable roll. It then passes horizontally through a lehr where it is cooled and annealed and then cut to suitable size. The present invention is applicable to any of these processes or to any similar process wherein the glass sheet is drawn continuously from a bath of molten glass.

In all of these processes as carried out commercially at the present time the glass produced has a characteristic wave extending longitudinally and sometimes latitudinally of the rising glass sheet and has other defects therein, such as batter, which renders it not as acceptable for certain purposes as what is known as plate glass, that is, glass which has been ground and polished to a high finish. Such defects cause distortion of objects viewed therethrough and this is particularly apparent where the objects are viewed at a relatively sharp angle.

The aforesaid Magrini application discloses a method and apparatus for substantially eliminating the aforesaid defects but in the carrying out of that process and particularly where warm air is supplied to the drawing pit and circulated transversely of the rising glass sheet from one edge thereof to substantially the other edge thereof at or adjacent the meniscus, difficulty has been encountered due to the tendency of the rising glass sheet to bow or warp, the bowing or warping causes breakage in passing through the rolls and some of it is being retained in the finished product. By the present invention I have overcome objectionable bowing or warping of the glass sheet so that the final product obtained is not only substantially free of waves and batter but it is also substantially free of objectionable bowing or warping which, as is well known, has a tendency to cause distortion and sometimes magnification of objects viewed therethrough.

While the present invention is particularly applicable to the process referred to in the aforesaid Magrini application, it is not limited thereto but, on the contrary, may be applied to any of the aforesaid processes wherein bowing or warpage may be encountered.

In accordance with the present invention I blow a curtain of a gaseous medium, preferably air, at a temperature substantially below that of the glass sheet against at least one face of the drawn glass sheet at a point in the travel of the sheet when it has become at least partially set, and preferably after it has passed through at least a portion of the annealing range, which in the case of ordinary drawn glass is from approximately 850° F. to 1100° F. The blowing of air directly against the rising glass sheet at such a time results in the removal or prevention of objectionable warping or bowing. I have found that in the Fourcault method of manufacture it is preferable to cause the curtain of the gaseous medium to impinge upon the rising glass sheet at an angle of approximately 45° to the glass sheet and to direct the air upwardly in the direction of travel of the glass sheet. I have also found it preferable in the Fourcault process to have this curtain of the gaseous medium impinge upon the glass sheet between the point where the glass sheet exits from the drawing pit and the point where it is engaged by the first set of rolls in the lehr and to utilize air at a temperature of approximately 80° F.

In actual practice I have found that the desired results can be accomplished by placing a 1¼ inch delivery pipe in the lehr at the point mentioned above and by providing a ⅛ inch longitudinally extending slot in the delivery pipe which extends from one edge of the glass sheet to the other edge thereof, and by supplying air to the pipe by a blower, the air being preferably at a temperature of approximately 80° F. and supplied to the pipe at a pressure of approximately 3 inches of water on the blower.

While I prefer to utilize a pipe of this character adjacent each face of the rising glass sheet and to blow the air against both faces of the rising glass sheet I have found that in most cases satisfactory results can be obtained where the air is blown against one face of the rising glass sheet, preferably the side of the glass on the canal side of the drawing pit.

In the accompanying drawings I have shown for purposes of illustration only a preferred embodiment of my invention.

In the drawings:

Figure 4 is a detail view of the pipe shown in Figure 1 for delivering the gaseous medium against the glass sheet; and Figure 5 is a diagrammatic view of the arrangement of the gas delivery apparatus shown in Figure 1.

Figure 1:
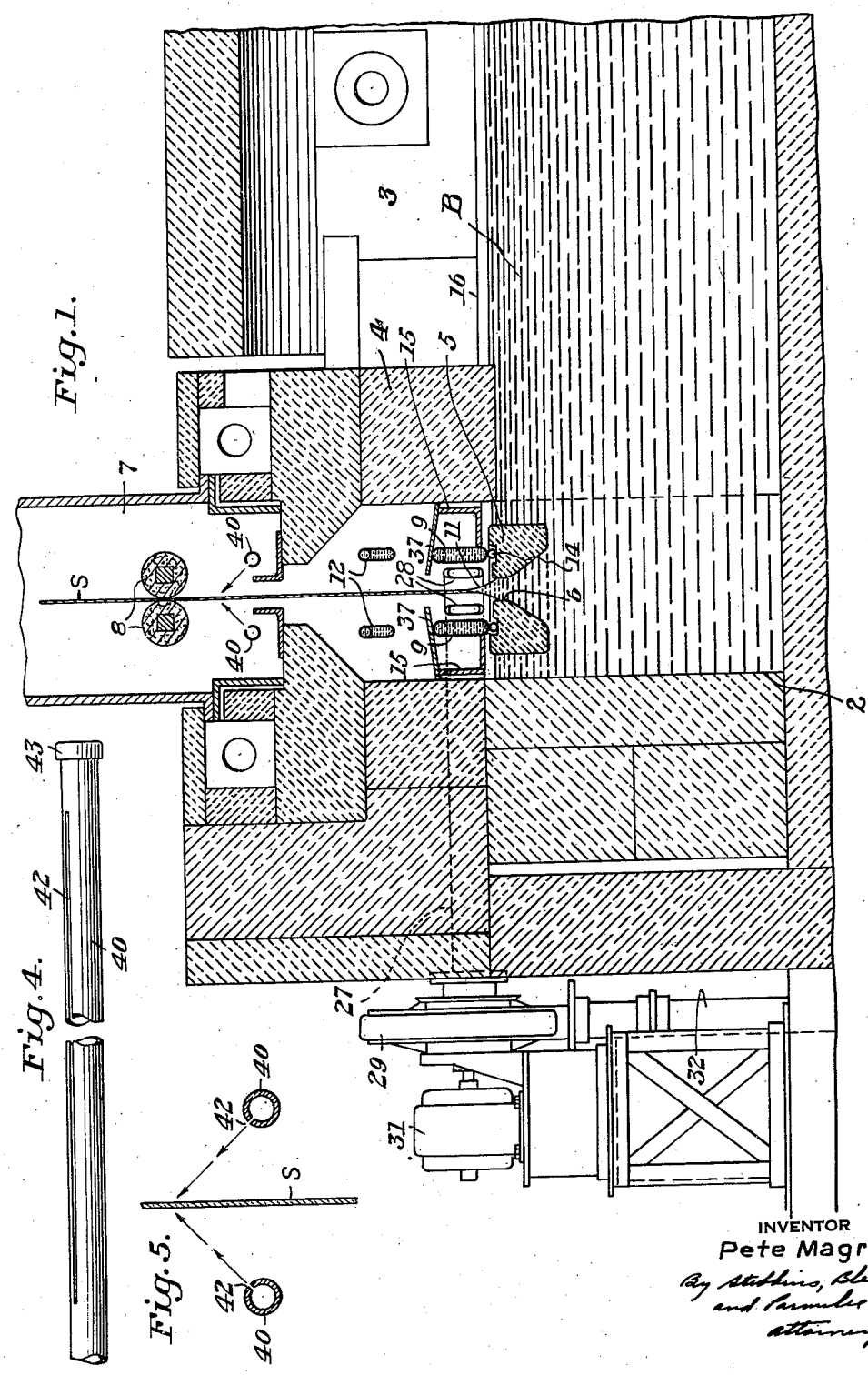
Figure 1 is a transverse sectional view through glass drawing apparatus embodying my invention.
Figure 2:
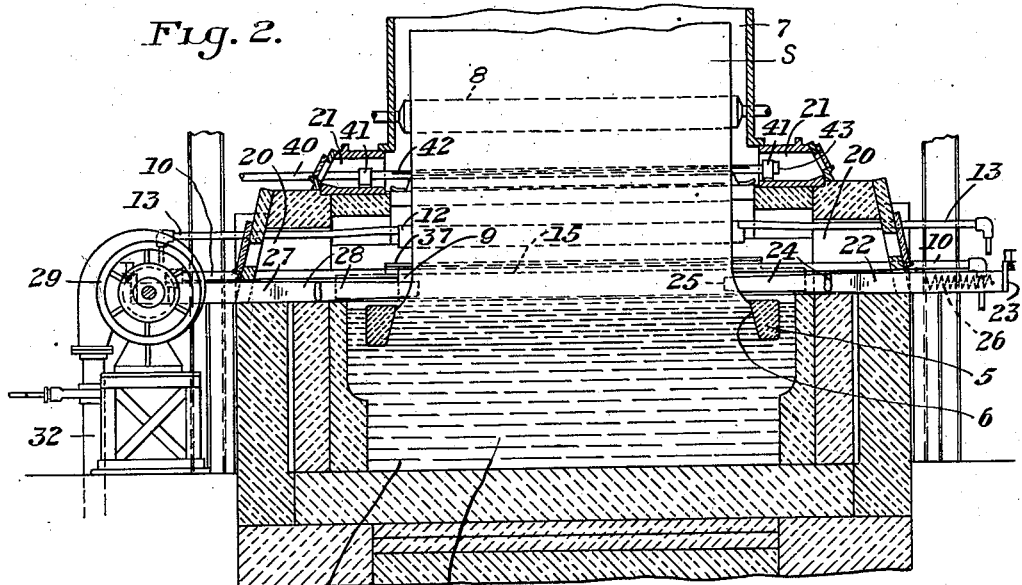
Figure 2 is a longitudinal section through the structure shown in Figure 1.
Figure 3:
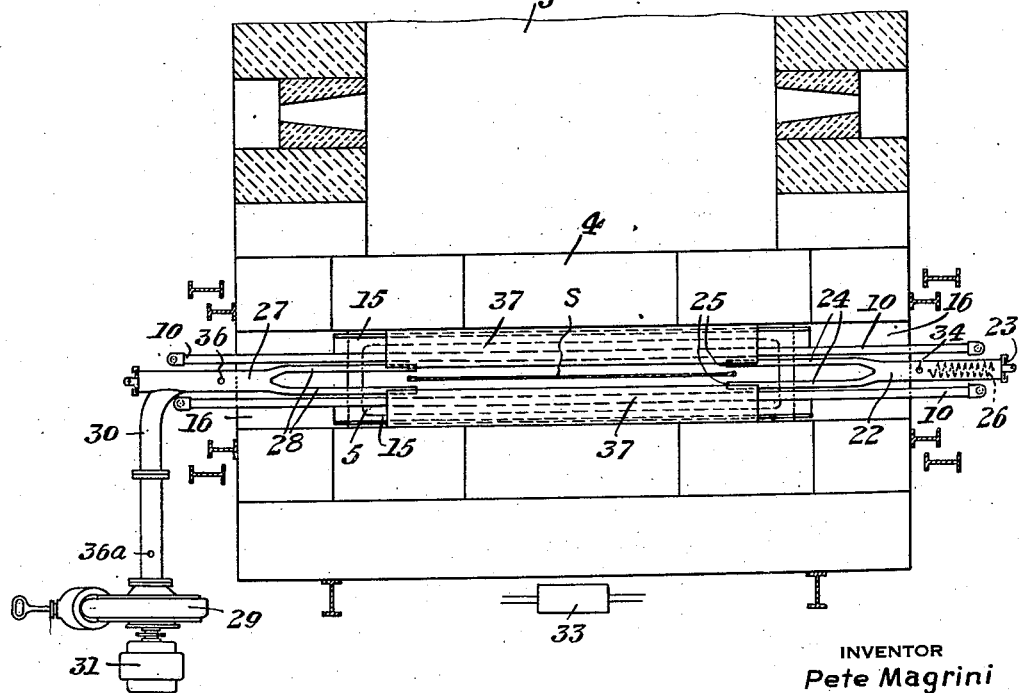
Figure 3 is a horizontal sectional view through the structure shown in Figures 1 and 2 taken immediately above the main coolers.

As shown in the drawings, the bath of molten glass B in the drawing pit 2 is fed to the drawing pit through a canal 3, the canal and the drawing pit being separated by a bridge wall 4.

A debiteuse 5 having a longitudinally extending slot 6 is provided in the drawing pit. The debiteuse or floater 5 is held partially submerged in the glass bath by means of appropriate holddown bars cooperating with the corners thereof. The glass wells upwardly through the slot 6 and the rising glass sheet S is initially started upwardly by means of a bait. The rising glass sheet passes upwardly through the drawing pit and into the lehr 7 which is in communication with the upper end of the drawing pit and which extends vertically above the pit. The lehr 7 is sufficiently long to permit the cooling of the rising glass sheet to a sufficient temperature to permit handling of the sheet. Adjacent the top of the lehr the rising glass sheet is cut into appropriate lengths for handling. As stated above, the rising glass sheet is initially started upwardly by means of a bait but after it has been started vertically the rolls 8, of which there are a number of pairs in the lehr, carry the glass sheet vertically.

The drawing pit is provided with longitudinally extending coolers 9 which are located on opposite faces of the rising glass sheet and extend throughout substantially the entire length of the slot in the debiteuse. By means of appropriate pipe connections 10 water is delivered to and discharged from each of said coolers. These coolers are normally spaced only a relatively short distance above the surface of the glass bath, being positioned adjacent the meniscus 11 of the rising glass sheet. Auxiliary coolers 12 are located above the main coolers 9 for effecting a further cooling of the rising glass sheet and for aiding in the proper annealing of the glass sheet as set forth in the Monro Patent No. 2,002,544. These coolers are likewise provided with appropriate pipe connections 13 for supplying water thereto and discharging it therefrom continuously. Normally the coolers 12 will be approximately 3 inches in height and the main coolers 9 approximately 6 inches in height, although it will be understood that various different arrangements of coolers and various different sizes thereof may be employed.

Each of the main coolers 9 has a pipe 14 secured to the base thereof, such pipe members normally resting on the upper face of the debiteuse. These pipes are for the purpose of blocking off the area between each cooler and the debiteuse so as to prevent flow of air either inwardly or outwardly beneath the coolers. In the apparatus shown in the drawings heat distributing and cooling retarding members 15 are also utilized for aiding in equalizing the temperatures in the glass bath longitudinally of the drawing pit. These heat distributing and cooling retarding members are in the form of angles preferably made of some heat resisting material such as the metal sold under the trade name of "Duraloy." In the structure shown in the drawings the vertically extending legs of the angles are approximately 5 inches in length and the horizontally extending legs thereof are approximately 4½ inches in length. As indicated above, these angles extend longitudinally of the drawing pit and may be positioned in various different locations in the pit. It has been found that in the structure shown in the drawings it is preferable to support both of the Duraloy angles 15 in the breast wall 16, the horizontal leg thereof abutting the adjacent side of the adjacent cooler 9. By supporting it on the breast wall it is elevated somewhat over an inch above the level of the molten glass under normal operating conditions.

As pointed out above, in the installation shown in the drawings waves and hence distortion resulting therefrom are substantially eliminated by the transverse circulation of air from one edge of the rising glass sheet to the other edge thereof adjacent the meniscus. Either atmospheric air or preheated air may be employed for this purpose. However, preheated air gives the best results in view of the fact that it not only appreciably reduces the distortion but it also materially reduces or substantially eliminates any batter in the sheet. The openings 20 above the breast wall on each end of the pit are preferably maintained closed. Likewise the openings 21 in the base of the lehr are normally preferably maintained closed although under certain operating conditions it may be advisable to maintain open one or more of these openings. The air or other gas for removing distortion from the sheet is fed into the drawing pit through a tunnel 22. The tunnel 22 rests on the breast wall 16 and the intake end thereof is positioned outside the pit. This intake end is provided with an adjustable gate 23 for regulating the amount of air admitted to the pit. The other or discharge end of the tunnel 22 is forked so as to provide spaced forks 24 adapted to be positioned on each face of the rising glass sheet. The forks 24 are preferably spaced apart approximately 3¼ inches and the open ends 25 of the forks are preferably 3 inches in height by 1⅛ inches in width. These forks 24, as is shown, extend to the adjacent edge of the rising glass sheet and discharge on opposite faces of the rising sheet. The air entering the tunnel is ordinary atmospheric air but it passes over an electric heating element 26 positioned within the tunnel. This entering air is preferably heated to approximately 375° F.

Air is drawn from the pit by means of a similar tunnel 27 on the opposite end of the drawing pit. The tunnel 27 is likewise provided with forks 28 which extend inwardly of the pit to a point adjacent each face of the rising glass sheet adjacent the meniscus 11. The tunnel 27 is likewise supported on the breast wall 16 on the outlet end of the pit.

The flow of air into the pit through the tunnel 22 and from the pit through the tunnel 27 is effected by means of an exhaust fan 29 which is connected to the tunnel 27 by suitable piping 30. The exhaust fan 29 is provided with an operating motor 31. The air drawn from the furnace through the tunnel 27 by the fan 29 is discharged through an exhaust line 32 which may extend beneath the floor level and be connected to the exhaust system of the plant. The temperature of the air passing through the discharge tunnel 27 is approximately 540°. A potentiometer 33 may be utilized for recording the temperatures of the incoming and outgoing air. A base couple 34 is provided in the inlet tunnel 27 and base couples 36 and 36a are provided in the exhaust tunnel and exhaust line for this purpose.

In order to shield and maintain the transverse flow of air described above metal shields 37 are positioned over top the main coolers 9. Each shield 37 extends longitudinally of the drawing pit throughout the width of the rising glass sheet. One end of each shield is supported on the vertical leg of the adjacent heat distributing member and the other end of each shield is supported on the adjacent cooler. These shields extend inwardly from the coolers toward the rising glass sheet and, preferably, the ends thereof are from approximately 3/8 inch to 1 1/4 inches away from the rising glass sheet. These shields aid in preventing stray currents of air from joining the transverse flow of air and also prevent the vertical flow of this air along the rising glass sheet. They prevent the transversely flowing warm air from escaping and flowing upwardly intermediate the edges of the rising glass sheet.

As pointed out above, where a system of this character has been utilized difficulty has been encountered in the warping or bowing of the rising glass sheet. I have found that this can be prevented by utilizing a slotted pipe 40 adjacent each face of the rising glass sheet for discharging air at substantially atmospheric temperature against the faces of the rising glass sheet. These pipes 40 may be supported in any suitable manner such as by brackets 41. Each pipe is provided with a longitudinally extending slot 42 approximately the same length as the width of the rising glass sheet and these slots are preferably so disposed as to discharge the air at an angle of approximately 45° to the rising glass sheet. The one end of each pipe 40 is provided with a cap 43 and the other end thereof may be connected to a suitable blower (not shown) for supplying air at substantially atmospheric temperature under pressure to the pipes. In the installation shown in the drawings the pipes are approximately 1 1/4 inches in diameter and the slots therein are approximately 1/8 inch wide and 80 inches long. With apparatus of this character suitable results can be obtained by supplying air at a pressure of approximately 3 inches of water.

Before the rising glass sheet reaches the pipes 40 it has become substantially set and the discharge of air at atmospheric temperature directly against the face of the rising glass sheet therefore does not detrimentally affect the sheet but, on the contrary, eliminates bowing or warping thereof. In such an installation as that shown in the drawing the rising glass sheet has cooled down to at least the upper limit of the annealing range by the time the glass sheet has reached the pipes 40 but due to the retarding of the cooling in the drawing pit the rising glass sheet may not have completely passed through the annealing range before reaching the pipes 40. However, I have found that the discharging of air directly against the rising glass sheet has no appreciable detrimental effect on the annealing of the glass sheet.

While I have shown and described the preferred embodiment of my invention it will be understood that I do not intend to be limited thereto as my invention may be otherwise embodied or practiced within the scope of the appended claims.

I claim:

1. In the manufacture of ordinary drawn glass, the steps comprising forming the glass sheet by continuous drawing from a bath of molten glass, circulating a gas transversely of and in contact with the rising glass sheet from one edge thereof to substantially the other edge thereof adjacent the meniscus, and after the temperature of the glass sheet is at or about the annealing range cooling one face of the glass sheet at a more rapid rate than the other face thereof, whereby bowing and warping of the glass sheet are prevented or corrected.

2. In the manufacture of ordinary drawn glass, the steps comprising forming the sheet by continuous drawing from a bath of molten glass, circulating a gas in contact with both faces of the glass sheet in the same direction transversely of the sheet from one edge thereof to substantially the other edge thereof adjacent the meniscus, and after the glass sheet has passed through at least a portion of the annealing range blowing a gas having a temperature substantially below that of the glass sheet against at least one face thereof to cool one face thereof at a more rapid rate than the other face, whereby bowing and warping of the glass sheet are prevented or corrected.

3. In the manufacture of ordinary drawn glass, the steps comprising forming the sheet by continuous drawing from a bath of molten glass and, while the temperature of the sheet is at or about the annealing range, cooling one face of the glass sheet at a more rapid rate than the other face thereof, whereby bowing and warping of the glass sheet are prevented or corrected.

4. In the manufacture of ordinary drawn glass, the steps comprising forming the glass sheet by continuous drawing from a bath of molten glass and, while the temperature of the sheet is at or about the annealing range, cooling one face of the glass sheet at a more rapid rate than the other face thereof by blowing a curtain of a gas having a temperature substantially below that of the glass sheet directly against at least one face of the sheet and in an amount sufficient to prevent or correct bowing and warping of the sheet.

PETE MAGRINI.